(12) United States Patent
Jöckel et al.

(10) Patent No.: US 12,374,968 B2
(45) Date of Patent: Jul. 29, 2025

(54) DYNAMOELECTRIC ROTARY MACHINE WITH A CAN

(71) Applicant: Flender GmbH, Bocholt (DE)

(72) Inventors: Andreas Jöckel, Nuremberg (DE); Roland Zeichfüssl, Ruhstorf a.d. Rott (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/026,013

(22) PCT Filed: Sep. 2, 2021

(86) PCT No.: PCT/EP2021/074197
§ 371 (c)(1),
(2) Date: Mar. 13, 2023

(87) PCT Pub. No.: WO2022/058171
PCT Pub. Date: Mar. 24, 2022

(65) Prior Publication Data
US 2023/0318410 A1 Oct. 5, 2023

(30) Foreign Application Priority Data

Sep. 18, 2020 (EP) .................... 20196796

(51) Int. Cl.
*H02K 11/40* (2016.01)
*F03D 9/25* (2016.01)
(Continued)

(52) U.S. Cl.
CPC ............... *H02K 11/40* (2016.01); *F03D 9/25* (2016.05); *H02K 5/15* (2013.01); *H02K 7/083* (2013.01);
(Continued)

(58) Field of Classification Search
CPC .......... H02K 11/40; H02K 5/15; H02K 7/083; H02K 7/116; H02K 7/1838; H02K 9/197; F03D 9/25; F05B 2220/706
(Continued)

(56) References Cited

U.S. PATENT DOCUMENTS 4,994,700 A * 2/1991 Bansal ................. H02K 3/48
310/60 A
5,821,649 A 10/1998 Langhorst
(Continued)

FOREIGN PATENT DOCUMENTS

DE 102018206787 8/2019
EP 0 678 964 10/1995
(Continued)

OTHER PUBLICATIONS

Johannes Rehbein, Improved electrical conductivity of NCF-reinforced CFRP for higher damage resistance to lightning strike, Sep. 2017, Composites Part A, vol. 100, p. 352 (Year: 2017).*
(Continued)

*Primary Examiner* — Charles Reid, Jr.
(74) *Attorney, Agent, or Firm* — Henry M. Feiereisen LLC (57) ABSTRACT

A dynamo-electric rotary machine includes a rotor defining an axis, a stator, and a can designed for arrangement in an air gap between the rotor and the stator in order to seal the stator and the rotor in relation to each other. The can has at least one section of average electrical conductivity in a range from 1 S/m to 10000 S/m in an axial and/or a tangential direction. The can is electrically conductively incorporated in an earthing system of the dynamo-electric machine.

16 Claims, 5 Drawing Sheets

(51) Int. Cl.
*H02K 5/15* (2006.01)
*H02K 7/08* (2006.01)
*H02K 7/116* (2006.01)
*H02K 7/18* (2006.01)
*H02K 9/197* (2006.01)

(52) U.S. Cl.
CPC ........... *H02K 7/116* (2013.01); *H02K 7/1838* (2013.01); *H02K 9/197* (2013.01); *F05B 2220/706* (2013.01)

(58) Field of Classification Search
USPC ...................................... 290/44, 55
See application file for complete search history.

(56) References Cited

U.S. PATENT DOCUMENTS

| 2007/0186692 | A1* | 8/2007 | Waszak | H02K 1/16 |
| | | | | 73/862.331 |
| 2009/0324412 | A1* | 12/2009 | Roorda | F03D 1/0658 |
| | | | | 290/55 |
| 2017/0346360 | A1 | 11/2017 | Heidler | |
| 2019/0356191 | A1* | 11/2019 | Simonsen | H02K 7/003 |
| 2020/0177048 | A1 | 6/2020 | Schroth et al. | |
| 2023/0243339 | A1* | 8/2023 | Teringl | H02K 3/12 |
| | | | | 310/58 |

FOREIGN PATENT DOCUMENTS

| EP | 1413046 B1 * | 5/2006 | ............. B60L 58/21 |
| EP | 2 669 512 | 12/2013 | |
| EP | 3955424 A1 * | 2/2022 | ............... F03D 9/25 |

OTHER PUBLICATIONS

International Search Report issued by the European Patent Office in International Application PCT/EP2021/074197 on Jan. 4, 2022.
Dana Pantea et al: "Electrical conductivity of conductive carbon blacks: influence of surface chemistry and topology", in: Applied Surface Science 217, 2003, pp. 181-193.
Qian Zhao et al.: "Review on the electrical resistance/conductivity of carbon fiber reinforced polymer", in: INSPEC (online), Jun. 11, 2019, abstract.

* cited by examiner

DYNAMOELECTRIC ROTARY MACHINE WITH A CAN

CROSS-REFERENCES TO RELATED APPLICATIONS

This application is the U.S. National Stage of International Application No. PCT/EP2021/074197, filed Sep. 2, 2021, which designated the United States and has been published as International Publication No. WO 2022/058171 A1 and which claims the priority of European Patent Application, Serial No. 20196796.5, filed Sep. 18, 2020, pursuant to 35 U.S.C. 119 (a)-(d).

BACKGROUND OF THE INVENTION

The invention relates to a dynamo-electric machine, a geared generator arrangement having a dynamo-electric machine, and a wind turbine having a geared generator unit.

In dynamo-electric machines (motors or generators), voltage-impressing converters generate what is referred to as a common-mode voltage with which the winding of the stator is continuously charged and discharged again. In accordance with a capacitive divider ratio following the geometry of the machine, said voltage is transmitted to the rotor and is applied as capacitive voltage across the bearing. In rolling contact bearings or machines or components connected to the shaft, these bearing voltages may cause a large amount of damage due to electric discharge machining (EDM) effects. In particular, in directly connected working machines, e.g. gearboxes (in the case of what are referred to as geared motors or geared generators), not only the bearings, but also the toothings may incur severe damage due to the electric discharge machining (EDM) currents.

Furthermore, because of the rapid increasing current, these converters generate an annular flow in the stator yoke, leading in the rotor to a voltage between the two axial shaft ends.

Up to now, the capacitive bearing voltages have been blocked by bearing insulation of greater or lesser complexity or have been dissipated by earth brushes between stator and rotor. In difficult cases, e.g. machines with a double feed, intensive measures in terms of cost and maintenance have to be taken, i.e. implementing bearing insulation plus incorporating earth pressures and continuously monitoring same.

U.S. Pat. No. 5,821,649 describes a wind turbine having an electric machine which is connected by a cable to an electrical grid. The cable has an electrical shielding plate.

US 2019/0356191 A1 describes an electrostatic shielding system of an electric machine for avoiding interfering bearing currents by the use of a conductive end shield.

DE 10 2018 206 787 A1 describes a dynamo-electric rotary machine having a can, which is designed to be arranged in an air gap between a rotor and a stator of the dynamo-electric rotary machine in order to seal stator and rotor in relation to each other, wherein the can at least in sections has average electrical conductivity ranging from 1 S/m to 10000 S/m in the axial and/or tangential direction.

Proceeding from this, the invention is based on the object of creating a powerful dynamo-electric machine which avoids the abovementioned disadvantages, has a reliable and simple earthing concept and at the same time has high power density. In particular, the intention is to avoid destructive bearing voltages.

SUMMARY OF THE INVENTION

The stated object is achieved by a dynamo-electric rotary machine as set forth hereinafter. Embodiments of the invention are the subject matter of dependent claims.

The stated object is also achieved by a dynamo-electric rotary machine as set forth hereinafter.

The stated object is also achieved by a geared generator unit as set forth hereinafter.

The stated object is also achieved by a wind turbine as set forth hereinafter.

Dynamo-electric machines require sufficient cooling of their components, such as stator or rotor, for correct operation. This cooling is undertaken by means of air and/or by means of liquid. In the case of combined types of cooling, stator and rotor can be separated from each other by a can.

Cans of this type, also referred to as a stator can, are used, for example, in liquid-cooled electric machines, where they are arranged in the air gap between stator and rotor. The can exerts a hermetic sealing function there and prevents a cooling liquid, which is used, for example, for cooling the stator, from passing into the air gap or into the interior space of the rotor. The can separates the cooling liquid in the stator region from the rotating rotor since the rotation of the latter would be greatly obstructed due to the viscosity of the cooling liquid and the resulting friction losses if said liquid were to pass from the stator region into the rotor region.

According to the invention, said can (=stator can) is now used not only for encapsulating the interior space of the stator, but is also part of an earthing system of a dynamo-electric machine. Said can has predeterminable electrical conductivity which is realized by means of conductive material (in particular CFRP or GFRP). The material here already implicitly has the desired electrical conductivity and/or a base material, which is weakly conductive, if at all, is provided with one or more electrically conductive layers.

Said can is electrically conductively incorporated in the earthing system of a dynamo-electric machine and/or of a geared generator unit and/or wind turbine. The can, via an earth to the housing, can thus prevent, or at least very greatly reduce, the "destruction" of the "capacitor" between stator and rotor and therefore the production of the capacitive bearing voltage.

If said can is now used together with a rotor mounted solely on one side (mounted in a floating manner), the electrical voltage at both axial shaft ends due to the parasitic annular flow is avoided. By means of the mounting on one side, the electrical potential of the rotor is kept there close to the housing potential, and the resulting voltage at the other, free shaft end cannot result in damage of a bearing.

It is also advantageous if other components with an earth contact or with a certain capacitance in the direction of earth (e.g. brakes, rotary encoders, etc.) are arranged on the side of said mounting, instead of being mounted on the side of the free shaft end (without bearings).

The concept according to the invention can also be realized in the case of shafts mounted on both sides. However, it is effective there only against capacitive bearing voltages and not against bearing currents excited by an annular flow due to feeding of the converter or against classic shaft voltages due to electromagnetic asymmetries.

According to the invention, the can used stator can) has the following advantages.

"Normally" an attempt would be made to necessarily design the can to be electrically insulating so that, during operation of the dynamo-electric machine, as few eddy currents as possible that contribute to heating of the can are therefore electromagnetically induced there. The efficiency of the dynamo-electric machine would therefore also be reduced.

However, according to the invention, use is now made of a material of the can and/or a coating of the can that is sufficiently conductive for the capacitive earthing, but at the same time is sufficiently insulating so as not to be too effected by eddy current losses because of the electromagnetics, which would lead to impermissible heating.

The can here has average electrical conductivity ranging from 1 S/m to 10000 S/m in the axial and/or tangential direction. Since the can (CFRP or GFRP tube) and/or the coatings used (lacquers or foils) are optionally designed to be inhomogeneous, reference is made to average electrical conductivity.

The average electrical conductivity of the can, ranging from 1 S/m to 10000 S/m in the axial and/or tangential direction, refers in particular to a (radial) thickness of 1 mm. In the case of a correspondingly thinner or thicker layer thickness, the electrical conductivity is correspondingly measured to be higher or lower.

A particularly good shielding effect has been obtained, for example, in the case of a coating with a coating thickness of 1 mm and conductivity of above 100 S/m.

Furthermore, by realizing the coating on that side of the can which faces the stator, unavoidable eddy current losses of the can or of the coating are now immediately removed by the liquid cooling assigned to the stator, i.e. the temperatures are kept limited to a comparatively low level.

This results in a minimal-cost and wear-free suppression of the capacitive bearing voltages and therefore prevention of the EDM effects in the connected bearings and/or toothings of an activable gearbox or of a working machine.

There is also a further positive aspect with mounting the dynamo-electric machine, for example a generator, on one side: the capacitive and/or ohmic effect of the bearing (or of the toothing in the case of a directly flange-mounted gearbox) keeps the potential of the shaft in the region of the bearing to housing potential. Bearing insulation or an earth brush is unnecessary.

The can is alternatively also constructed from one or more layers which may have different electrical conductivities.

Cans having one or more layers of different plastics arranged one above another or next to one another are, inter alia, possible here. These plastics can be fibre-reinforced, in particular with glass fibres (GFRP) or carbon fibres (CFRP). The thicknesses of the layers can be between 0.1 mm and 10 mm. Sufficiently high mechanical stability has been achieved in previous applications with layer thicknesses ranging from 1 to 3 mm.

In one embodiment of the invention, a virtually electrically insulating can is provided with an only weakly electrically conductive coating, if electrically conductive at all, e.g. copper conductive lacquer. Said lacquer has a predeterminable particle density per unit of area in order to obtain the required electrical conductivity.

This coating can be applied to the outside and/or inside of the can. A coating on both sides has an improved effect, but is more costly to produce.

Alternatively and/or additionally thereto, said conductive layer can also be designed as a foil, e.g. from correspondingly conductive materials, such as stainless steel, aluminium, copper, etc.

Good results have been achieved with a coating on a base material of typically 50 to 200 micrometres, and, in the case of foils, good results have also been obtained with typically 4 to 28 micrometres. However, it can be assumed that, even in the case of layer thicknesses of 1 to 500 micrometres, sufficient results (sufficient conductivity in order to reduce the bearing voltage) can be anticipated.

In order to achieve a good shielding effect of the can and at the same time to keep the losses from eddy currents low, an inhomogeneous conductivity of the conductive layer is advantageous by, for example, only strips being applied. Said strips can be designed to be full of gaps at predeterminable distances in order to minimize the eddy current losses.

For a good shielding effect, however, the strips may also be designed to overlap, for example in the form of shingles. In order to limit the eddy current losses here, an insulator should be arranged in between.

The strips, as an electrically weakly conductive lacquer, can also be combined in an alternating manner in sections with an electrically more highly conductive lacquer.

Electrically weakly conductive is understood here as meaning a conductivity of approx. 10 S/m with a thickness of the coating/foil of 100 micrometres. Electrically more highly conductive is understood here as meaning a conductivity of approx. 1000 S/m with a thickness of the coating/foil of 100 micrometres.

The conductive layer can also be restricted to the regions of the slot openings in the stator and optionally in addition to the region of the winding heads since the stator teeth are generally already connected to housing potential via the stator laminated core.

The electrical conductivities should be established here in the abovementioned regions.

The conductive layer or the conductive layers are electrically very readily conductively connected with low inductance to the housing potential on at least one side of the dynamo-electric machine. For this purpose, use is made of flexible earthing strips (e.g. cables or copper mesh) in order, inter alia, to compensate for different thermal expansions. Under some circumstances, a plurality of earthing lines distributed over the circumference are necessary.

Alternatively and/or additionally, use can also be made of one or more resilient contact pins in order to compensate for the, inter alia, thermal expansions, inter alia, of the can and nevertheless to obtain sufficient electrical conductivity of the earth connection.

In order to obtain a better electrical connection between a moderately conductive layer and the housing, a very readily conductive component, e.g. a copper ring, can be installed on the end regions of the can, i.e. at the locations where high magnetic fields do not occur, said component being incorporated in the earthing system of the machine or of an entire system.

A plurality of contact connections of the can to the earthing system of the housing are also possible here, e.g. pins, resilient contact pins, flexible earthing strips, or a copper ring (possibly slotted) on the can. However, care should be taken to ensure that electrically conductive meshes which might lead to inductive interference are not formed.

If, in the case of unilateral earthing, the opposite side of the can (i.e. the location where there is no bearing) is comparatively readily insulated in relation to the housing potential, e.g. via a seal and/or a spacing, a particularly good shielding effect is obtained and currents are avoided in the can, which currents would otherwise arise in the current path "can, connection to housing potential on one side, housing, connection to housing potential on the opposite side" back into the can.

A connection on both sides of the generator to the housing potential is possible and obtains an improved shielding effect especially in the case of converters having slowly rising voltage flanks (a few 100 μs).

The can, in particular the conductive layer(s) of the can, instead of or in addition to being electrically conducted to the housing, are also electrically connected to other components, in order to deploy a shielding effect, e.g. directly to earth potential or to a line directly to the converter.

A can of this type can be used in dynamo-electric machines for wind turbines with and without a gearbox, and in large machines which are connected in particular directly to working machines, and also in the automotive "e-car" industry.

The can according to the invention is suitable in particular for powerful machines above 1 MW and/or large machines having stator inner surfaces of more than 1 m² since especially high bearing voltages occur there.

According to the invention, a dynamo-electric machine with very high power density is now obtained, with a very high degree of protection. Furthermore, bearing voltages are prevented in a simple and reliable way, even in the case of gearbox-integrated drives.

BRIEF DESCRIPTION OF THE DRAWING

The invention and further advantageous refinements of the invention can be gathered from the exemplary embodiments which are illustrated; in the figures.

DETAILED DESCRIPTION OF PREFERRED EMBODIMENTS

In the following description of the figures, identical components are indicated by the same reference signs in the various figures. It is therefore possible that, in the description of a further figure, explanations in greater detail are not found for a certain reference sign which has already been explained in conjunction with another figure. In such a case, it can be assumed in the embodiment of the further figure that, even without more detailed explanation in conjunction with said further figure, the component indicated there by said reference sign has the same properties and functionalities as explained in conjunction with the other figure.

Furthermore, for reasons of clarity, sometimes not all of the reference signs are depicted in all of the figures; instead, only those are depicted to which reference is made in the description of the respective figure or which appear necessary for comprehension.

It should be noted that terms such as "axially", "radially", "tangentially" etc. refer to the axis 16 used in the respective figure or in the respectively described example. In other words, the directions axially, radially and tangentially always refer to an axis of rotation of the rotor 17, and therefore to the corresponding axis of symmetry of the stator 2. In this case, "axially" describes a direction parallel to the axis 16, "radially" describes a direction orthogonal to the axis 16, towards said axis or else away therefrom, and "tangentially" is a direction which is directed at a constant radial distance from the axis and, in the case of a constant axial position, is directed circularly around the axis. The expression "in the circumferential direction" can be substantially equated with "tangentially".

With regard to an area, for example a cross-sectional area, the terms "axially", "radially", "tangentially", etc. describe the orientation of the normal vector of the area, i.e. the vector which is perpendicular to the area in question.

The term "adjacent", in conjunction with components, for example with coils or teeth of the stator, is intended to express the fact that, in the case of "adjacent components", there is in particular no further such component between these two components, and instead there is at most an empty intermediate space or optionally a component of a different type.

The expression "coaxial components", for example coaxial components such as rotor 17 and stator 2, is understood here as meaning components which have identical normal vectors and for which the planes defined by the coaxial components are therefore parallel to one another. Furthermore, the expression is intended to contain the fact that the centre points of coaxial components lie on the same axis of rotation or axis of symmetry. However, these centre points can optionally lie at different axial positions on said axis 16, and the planes mentioned are therefore at a distance>0 from one another. The expression does not necessarily require coaxial components to have the same radius.

For the sake of clarity, sometimes, in the cases in which components are present multiple times, frequently not all of the depicted components are provided with reference signs in the figures.

Figure 1:
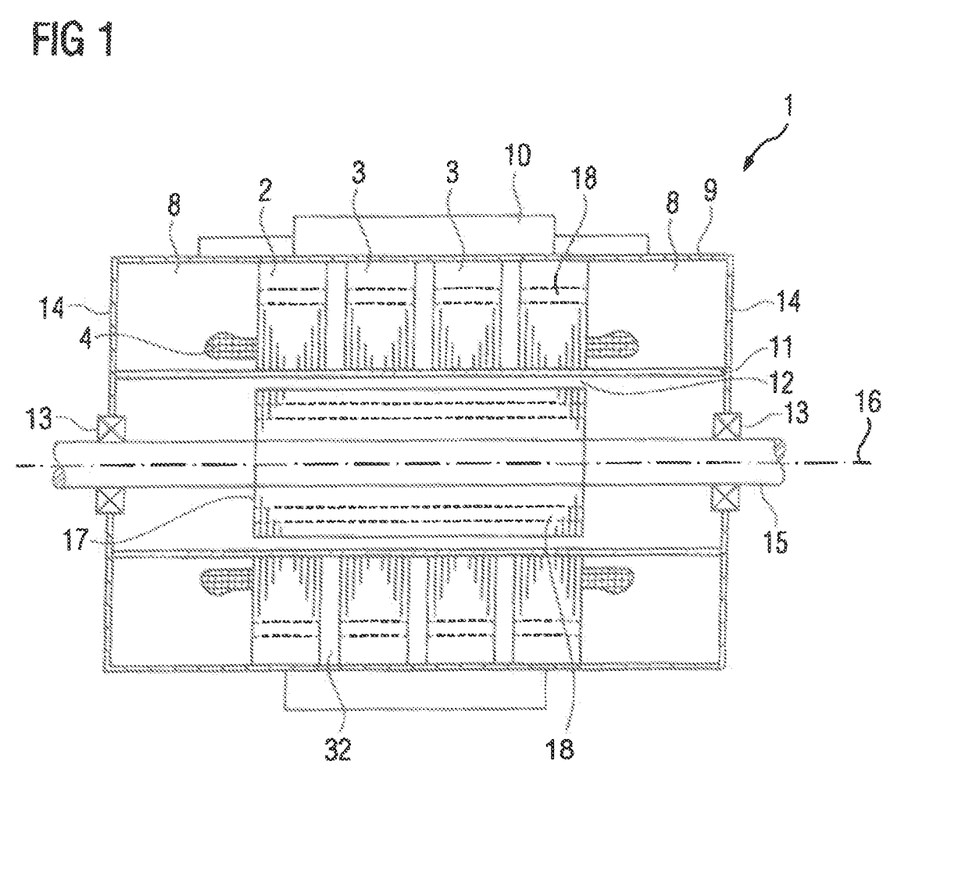
FIG. 1 shows a longitudinal section of a dynamo-electric machine.

FIG. 1 shows a substantially annular or hollow-cylindrical stator 2, and a cylindrical rotor 17 which is designed here by way of example as an internal rotor and is arranged substantially coaxially. The stator 2 has a magnetically conductive main body, with substantially axially running slots 6, in which is arranged a winding system 5 which forms winding heads 4 on the end sides of the stator 2.

In many cases, the magnetically conductive main body of the stator 2 is in the form of a laminated core. In this embodiment according to FIG. 1, the stator 2 is divided axially into partial laminated cores 3 which are at a distance 32 from one another.

The winding system 5 is constructed, for example, from tooth-wound coils. In the case of a tooth-wound coil, one coil side of the tooth-wound coil is in each case located in adjacent slots 6. However, the present invention is not restricted to an application using tooth-wound coils. The winding system 5 may also be, for example, form-wound coils with a slot division>1, and similarly also single-layer windings, two-layer windings, tooth-wound-coil windings or distributed windings.

The rotor 17 is arranged within the stator 2 and concentrically with respect thereto and rotates about an axis 16 in the operating state of the dynamo-electric machine 1. The rotor 17 has magnetic means which can be designed, for example, as permanent magnets 21 and arranged on a surface of the rotor 17 facing the stator 2, This is merely indicated schematically, for example, in FIG. 1 without entering in more detail into means which fix the permanent magnets 21 to the rotor 17, even in the case of the latter rotating rapidly. In a departure from the exemplary illustration, the rotor 17 could also be formed with "embedded" permanent magnets 21, as per FIG. 3, as squirrel-cage rotors or with wound poles.

The rotor 17 or its substantially cylindrical, magnetically conductive rotor main body, e.g. a laminated core or a laminated core provided with a supporting structure 33, is connected to a shaft 15 for rotation therewith. Rotation of the rotor 17 via the shaft 15 can be transmitted, owing to the electromagnetic interaction with the energized stator 2, to a component, not illustrated, which is to be driven, for example to a component of a drive system of a further system.

A can 11 is located in the air gap 12 between stator 2 and rotor 17 and shields the interior space 8 of the stator 2 from the interior space of the rotor 17. This permits liquid cooling of the stator 2, i.e. its laminated core or partial laminated cores 3, the winding heads 4, the winding system 5 in the slot 6, etc. The cooling liquid, for example oil, is in each case passed via the winding head 4 into the interior space 8 of the stator 2, and supplied via the distances 32 between the partial laminated cores 3 to a heat exchanger 10 again and recooled there.

The stator 2 is positioned in a housing 9 which accommodates end shields 14, bearings 13 or bearing arrangements which rotatably fix the shaft 15.

In addition to electromotive use, generator use of the dynamo-electric machine 1 is also possible, e.g. in a wind turbine 24 (FIG. 6) with or without a gearbox.

In addition, in the case of dynamo-electric machines 1 (motors or generators) with voltage-impressing converters, what is referred to as the common-mode voltage then occurs, with which the winding system 5 of the stator 2 is constantly charged and discharged again. According to a capacitive divider ratio following the geometry of the machine 1, this voltage is transmitted to the rotor 17 and is applied as a capacitive voltage across the bearing 13. These bearing voltages may cause a large amount of damage in rolling contact bearings or in machines or components connected to the shaft 15 due to electric discharge machining (EDM) effects. In particular, in directly connected working machines, e.g. gearboxes (in what are referred to as geared motors or geared generators), not only the bearings 13, but also the toothings of the gear wheels of the gearboxes may be severely damaged by the electric discharge machining (EDM) currents.

Furthermore, because of the rapid system-induced increase in current, these converters generate an annular flow in the yoke of the stator 2, leading to a voltage in the rotor 17 between the two axial shaft ends.

Since the can 11 according to the invention (=stator can) is now not only used, because of its predeterminable electrical conductivity, for encapsulating the interior space 8 of the stator 2, but also forms part of an earthing system of a dynamo-electric machine, the EDMs can be avoided and the potential difference between the axial shaft ends and the bearings 13 can be at least reduced.

Said can 11 obtains predeterminable electrical conductivity which is realized by means of a conductive material (in particular CFRP or GFRP). The material here preferably already implicitly has the desired electrical conductivity, or a base material is provided with one or more electrically conductive layers.

Said can 11 is electrically conductively incorporated in the earthing system of the dynamo-electric machine 1 and/or of a geared generator unit. The can 11, via an earthing to the housing 9, can thus prevent, or at least very greatly reduce, the "destruction" of the "capacitor" between stator 2 and rotor 17 and therefore the production of the capacitive bearing voltage.

The previously complicated bearing insulation is therefore no longer necessary. Similarly, earth brushes can be dispensed with.

Figure 2:
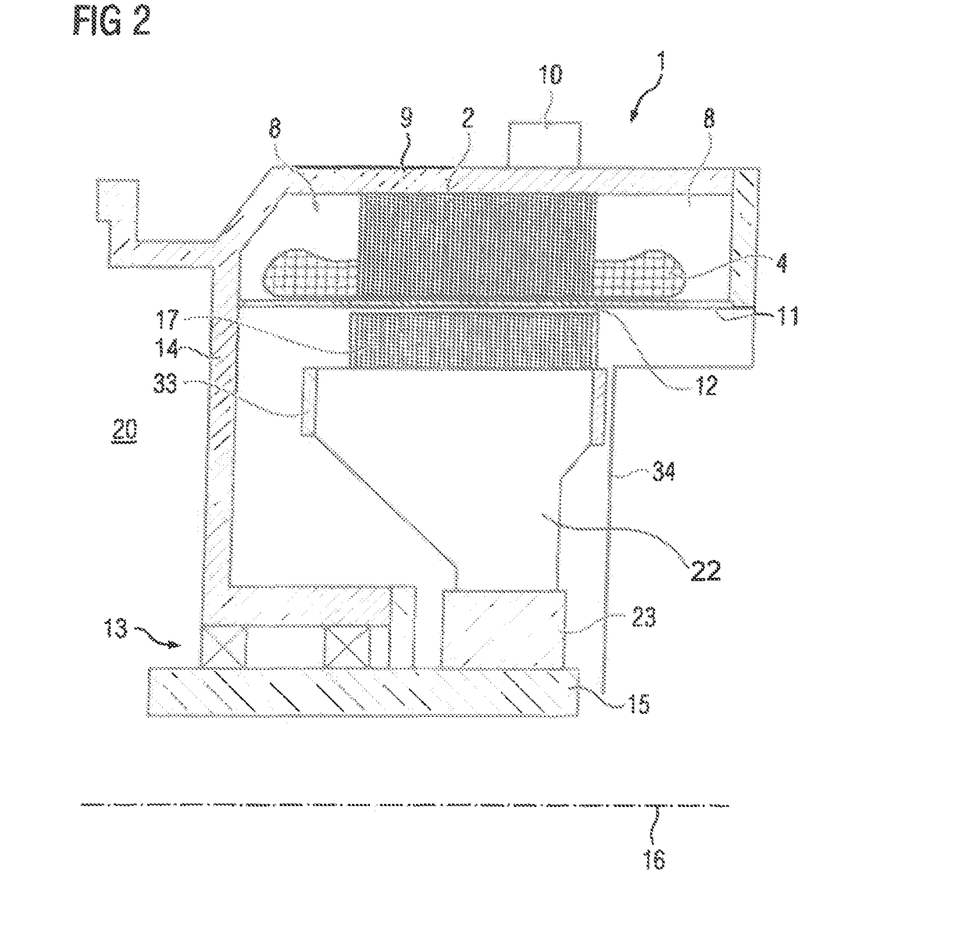
FIG. 2 shows a further longitudinal section of a dynamo-electric machine.

FIG. 2 shows, in a partial longitudinal section, a stator 2 of another dynamo-electric machine 1 which operates as a generator of a gearbox of a wind turbine 24 (FIG. 6), which gearbox can be flange-mounted on a directly adjacent construction space 20. The stator 2 has a laminated core since, in this case, it is not divided into axial partial laminated cores, but could also be divided into them. Otherwise, the stator 2 is substantially designed as in FIG. 1.

However, the rotor 17 is mounted in a floating manner only on the side facing the construction space 20. Housing 9 and/or end shield 14 has/have means for sealing the can 11 in relation to the interior space of the rotor 17.

As also in FIG. 1, cooling channels 18 of the stator 2 or else distribution channels are provided in or on the laminated core of the stator 2. Said channels can also run within the housing 9.

The laminated core of the rotor 17 is positioned on an, in particular spoke-shaped supporting structure 33, which reduces the inertia of the rotor 17 and permits efficient air cooling of the rotor 17 together with a covering 34. The supporting structure 33 is connected to a hub 23 which is fixed on the shaft 15, which is in the form of a hollow shaft, for rotation therewith.

There is yet another advantage hi unilaterally mounting the dynamo-electric machine 1. The capacitive and/or ohmic effect of the bearing (or of the toothing in the case of a directly flange-mounted gearbox) keeps the potential of the shaft 15 in the region of the bearing 13 to housing potential. Bearing insulation or an earth brush is unnecessary.

Said unilateral mounting of the rotor 17, together with the inventive can 11, reduces the electrical voltage, which is produced by the parasitic annular flow, at both axial shaft ends. The mounting on one side keeps the electrical potential of the rotor 17 there close to the housing potential, and the resulting voltage at the other, free shaft end cannot lead to damage of the bearing 13.

It is in principle also advantageous if other components with an earth contact or with a certain capacitance in the direction of earth (e.g. brakes, rotary encoders, etc.) are not mounted on the side of the free shaft end, but rather on the side of the bearing.

Figure 3:
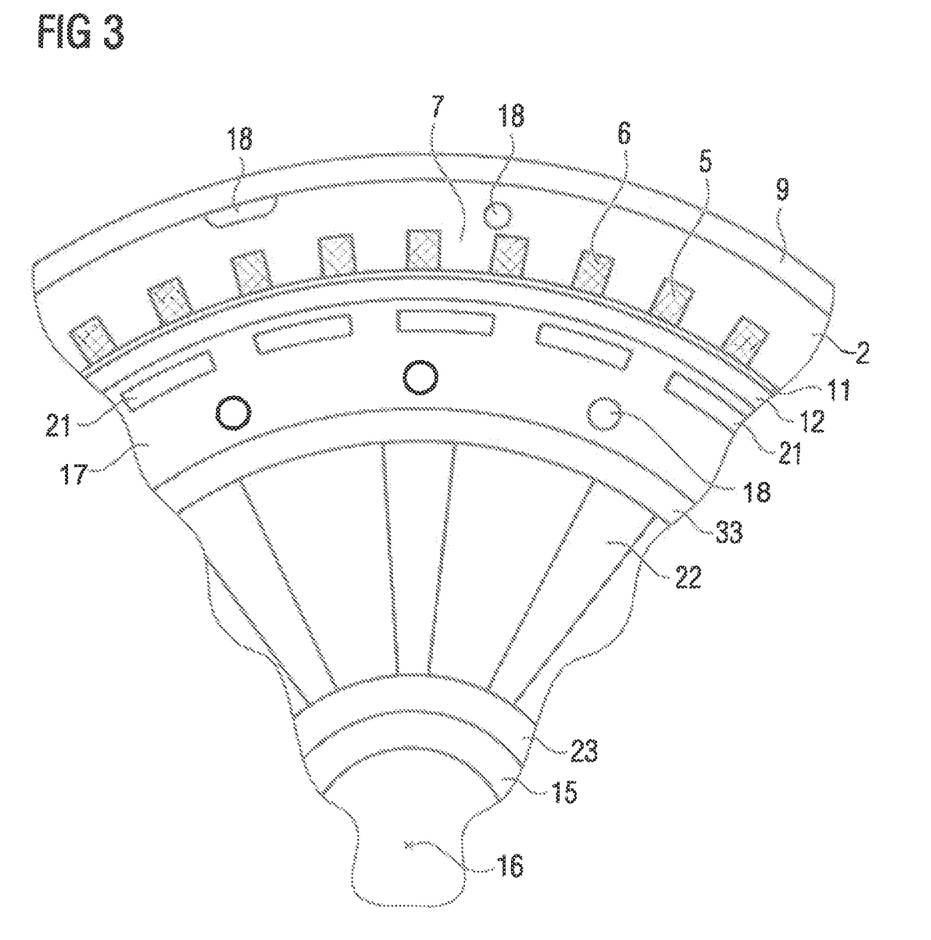
FIG. 3 shows a partial cross section of a dynamo-electric machine.

FIG. 3 shows, in a partial cross section, a dynamo-electric machine 1 according to FIG. 2. The hub 23 is connected to axial end disks of the rotor 17 by means of spokes 22 and forms a rigid, but nevertheless lightweight supporting structure 33 of the rotor 17. The spoke-shaped supporting structure 33 has intermediate spaces which simplify the access to braking arrangements, not illustrated specifically.

In order to realize air cooling of the rotor 17, the spokes 22 are configured in such a manner that either a suction effect or pressure effect is generated during rotation of the rotor 17.

In the two exemplary embodiments according to FIG. 1 and FIG. 2, the can 11 now has a number of options for obtaining predeterminable electrical conductivity.

The can 11 is constructed from one or more layers which can have different electrical conductivities.

In one embodiment of the invention, a weakly electrically conductive can, if it is electrically conductive at all, is provided with a moderately conductive coating, e.g. copper conductive lacquer. Said coating can be applied to, or sprayed onto, the outside and/or inside of the can 11. In this case, copper particles in a suitable size and/or number per unit of area are provided on the can 11. The density and/or size of said particles can vary on one or both skies of the can 11 in the axial direction and/or tangential direction.

Alternatively and/or additionally thereto, the conductive layer can also be hi the form of a foil, e.g. made from stainless steel, aluminium, copper, etc. The coating typically comprises 50 to 200 micrometres, and, hi the case of foils, typically 4 to 20 micrometres are provided, and, more broadly, 1 to 500 micrometres are provided.

Said foil is applied to the can 11 on one side and/or on both sides. For example, the coating on both sides could be of advantage for an asynchronous machine with a double feed.

Figure 4:
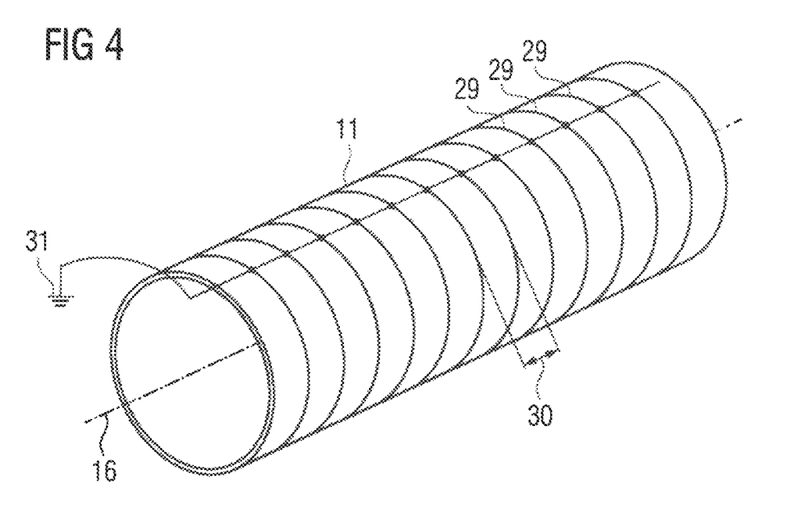
FIGS. 4 and 5 each show a can with conductive strips.
Figure 5:
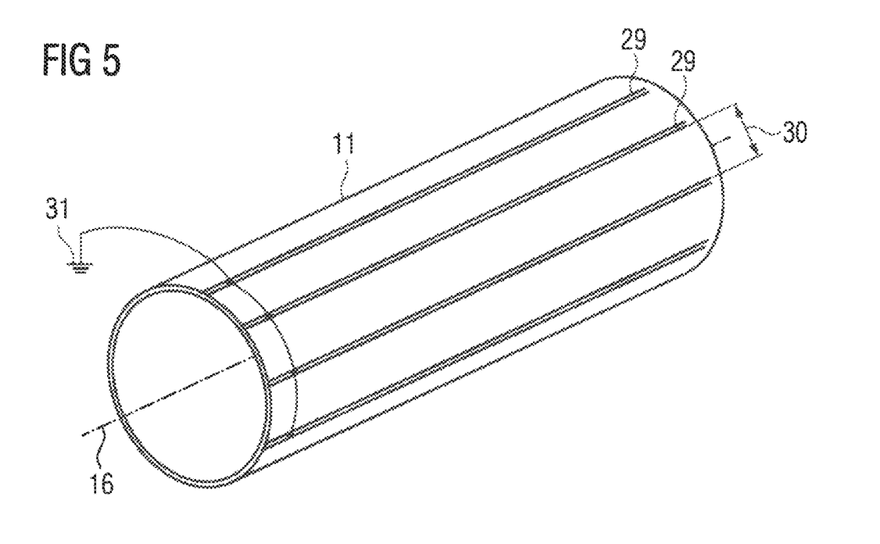

In order to achieve a good shielding effect of the can 11 and at the same time to keep the losses of eddy currents low, inhomogeneous conductivity of the conductive layer may be advantageous by, for example, only strips 29 according to FIGS. 4 and 5 being applied. Said strips 29 can be designed so as to be full of gaps at a predeterminable distance 30 in order to minimize the eddy current losses. For a good shielding effect, the strips 29, however, can also be designed so as to overlap. So that the eddy current losses then do not become too great, an insulation layer is provided in between.

The strips 29 can be combined not only as a foil, but also, by means of a weakly conductive lacquer, in an alternating manner in sections with a more highly conductive lacquer.

Electrically weakly conductive is understood here as meaning basically electrical conductivity of approx. 10 S/m at a thickness of the coating/foil of 100 micrometres, Electrically more highly conductive is understood as meaning here basically electrical conductivity of approx. 1000 S/m with a thickness of the coating/foil of 100 micrometres.

The conductive layer on or in the can 11 may also be reinforced or restricted only to the regions of the openings of the slots 6 of the stator 2 and optionally in addition the region of the winding heads 4 since the stator teeth 7 are generally already connected to the housing potential via the laminated core of the stator 2. There is then preferably also a contact connection to the earth connection 31 in said regions.

Accordingly, for example, a distance between the strips 29 in the circumferential direction would be the slot division of the stator 2.

The conductive layer or the conductive layers are electrically very readily conductively connected with low inductance to the housing potential on at least one side of the dynamo-electric machine 1. For this purpose, use is made of flexible earthing strips (e.g. cables or copper mesh) in order, inter alia, to compensate for different thermal expansions, Under some circumstances, a plurality of earthing lines distributed over the circumference are necessary. This can be realized, for example, alternatively and/or additionally by one or more resilient contact pins in order, inter alia, to compensate for the thermal expansion of the can 11 or other machine components and nevertheless to obtain sufficient electrical conductivity of the earth connection from can 11 to housing potential.

In order to obtain a better electrical connection between a moderately conductive layer and the housing 9, a very readily conductive component, e.g. a copper ring, can also be installed on the end regions of the can 11, i.e. at the locations where high magnetic fields do not occur, which component is incorporated in the earthing system of the machine 1 or of an entire system.

If, in the case of unilateral earthing (for example according to FIG. 2), the opposite side of the can 11 is comparatively readily insulated in relation to the housing potential, e.g. via a seal and/or a spacing, a particularly good shielding effect is obtained and currents are avoided in the can 11, which currents would otherwise arise in the current path "can 11, connection to housing potential on one side, housing 9, connection to housing potential on the opposite side" back into the can 11.

A connection on both sides of the generator to housing potential is possible and obtains an improved shielding effect especially in the case of converters with slowly rising voltage flanks, e.g. in the range of milliseconds or a few 100 μs.

The can 11, in particular the conductive layer(s) of the can 11, instead of or in additionally to being electrically connected to the housing 9, are also electrically connected to other components in order to deploy a shielding effect, e.g. directly to earth potential or to a line directly to a converter.

Figure 6:
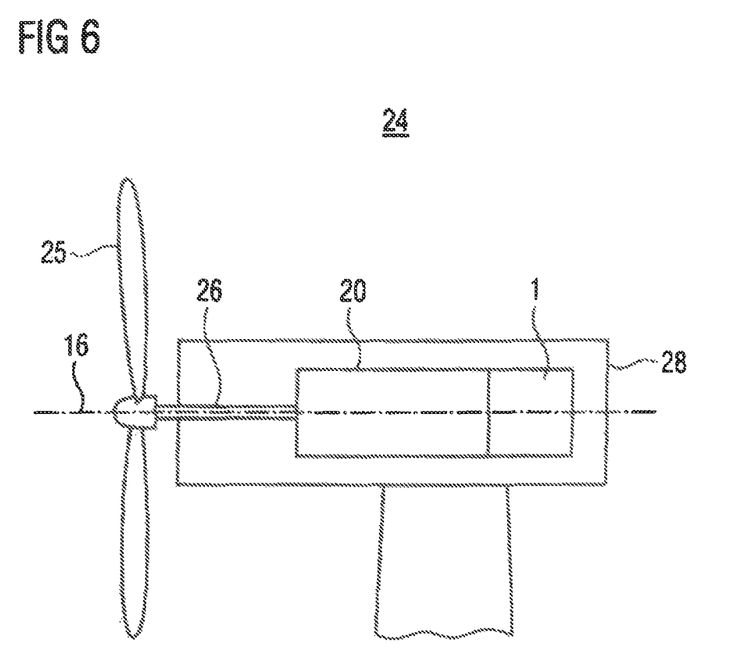
FIG. 6 shows a schematically illustrated wind turbine.

In principle, a compact, reliable geared generator unit according to FIG. 6 of a wind turbine 24 is made possible by the described design. The generator is mounted in a floating manner, for example as in FIG. 2, and therefore only one end shield 14 and thus only unilateral earthing have to be provided.

The stator 2 and optionally the gearbox unit have oil cooling. Separate cooling circuits, but also a common cooling circuit are conceivable here. The rotor 17 of the generator is cooled here by means of air.

The laminated cores of stator 2 and rotor 17 can be stacked axially continuously here. However, laminated cores composed axially of a plurality of partial laminated cores 3, in order to create additional radial cooling gaps, can also be realized.

A rotary dynamo-electric machine 1, preferably an asynchronous machine, for example with double feed, or a synchronous machine, is provided here as the generator. Numbers of pole pairs from two to thirty are conceivable here.

Transmission ratios between wind rotor shaft 26, which supports blades 25 and rotor 17 of the generator of 20 to 200 are sought, depending on the design.

The basic concept of the invention can also be transferred to linear motors.

In other words: said can 11 (=stator can) is used not only for encapsulating the interior space 8 of the stator 2 in order to separate different cooling media (such as oil and air), but also forms part of an earthing system of a dynamo-electric machine 1. Said can 11 here has predeterminable electrical conductivity which is realized by means of a conductive material (in particular CFRP or GFRP). In particular, the material here already implicitly has the desired electrical conductivity and/or a base material is provided with one or more electrically sufficiently conductive layers and/or strips 29 and/or regions.

Said can 11 is electrically conductively incorporated in the earthing system of a dynamo-electric machine 1 and/or of a geared generator unit. The can 11, via an earthing to the housing 9, can thus prevent, or at least very greatly reduce, the "destruction" of the "capacitor" between stator 2 and rotor 17 and therefore the production of the capacitive bearing voltage.

If said can 11 is now used together with a rotor 17 mounted only on one side (mounted in a floating manner, as in FIG. 2), the electrical voltage, which is generated by the parasitic annular flow, at both axial shaft ends is avoided. The mounting on one side keeps the electrical potential of the rotor 17 there close to the potential of the housing 9, and the resulting voltage at the other, free shaft end cannot lead to damage of a bearing 13.

It is also advantageous if other components with an earth contact or a certain capacitance in the direction of earth (e.g. brakes, rotary encoders, etc.) are not mounted on the side of the free shaft end, but on the side of said earthed bearing.

The can 11 here has average electrical conductivity ranging from 1 S/m to 10000 S/m in the axial and/or tangential direction. Since the can 11 (CFRP or GFRP tube) and/or the coatings used (lacquers or foils) are optionally designed to be inhomogeneous, reference is made to average electrical conductivity.

The average electrical conductivity of the can 11 ranging from 1 S/m to 10000 S/m in the axial and/or tangential direction refers in particular to a (radial) thickness of 1 mm.

In the case of a correspondingly thinner or thicker layer thickness of the can 11, the electrical conductivity has to be correspondingly higher or lower on the basis of said range or within said range.

A particularly good shielding effect has been achieved, for example, in the case of a coating with a cover thickness of 1 mm and conductivity of above 100 S/m.

The invention claimed is:

1. A dynamo-electric rotary machine, comprising:
   a shaft having a first end and a second end being a free shaft end;
   a bearing arrangement supporting the shaft on only the first end of the shaft for rotation about an axis;
   a rotor defining the axis, the rotor connected to the shaft for rotation about the axis with the shaft, the rotor mounted in a floating manner comprising a hub mounted to the free shaft end, a plurality of spokes mounted to the hub, a support structure mounted to the plurality of spokes, and the rotor mounted to the support structure;
   a stator including a winding system arranged in slots and forming winding heads on end sides of the stator and spaced apart from the rotor by an air gap; and
   a can located in the air gap between the rotor and the stator in order to seal the stator and the rotor in relation to each other and designed to separate an interior space of the stator from an interior space of the rotor, said can having at least one section of average electrical conductivity in a range from 1 S/m to 10000 S/m in an axial and/or a tangential direction and being electrically conductively incorporated in an earthing system of the dynamo-electric rotary machine.

2. The dynamo-electric rotary machine of claim 1, wherein the can is designed as a leakproof supporting structure which is substantially rotationally symmetrical with respect to the axis.

3. The dynamo-electric rotary machine of claim 2, wherein the leakproof supporting structure comprises CFRP or plastic.

4. The dynamo-electric rotary machine of claim 1, wherein the can is configured in a shape of a hollow cylinder.

5. The dynamo-electric rotary machine of claim 4, further comprising a conductive layer applied at least on a section of the can.

6. The dynamo-electric rotary machine of claim 1, further comprising a conductive layer applied at least on a section of the can.

7. The dynamo-electric rotary machine of claim 6, wherein the conductive layer is sprayed on or is in the form of a foil.

8. The dynamo-electric rotary machine of claim 6, wherein the conductive layer is formed inhomogeneously within the range of electrical conductivity from 1 S/m to 10000 S/m.

9. The dynamo-electric rotary machine of claim 6, wherein the conductive layer is formed by conductive strips lying within the range of electrical conductivity from 1 S/m to 10000 S/m.

10. The dynamo-electric rotary machine of claim 1, further comprising a housing accommodating the stator and having an end shield, said can being connected electrically conductively to the housing and/or to the end shield.

11. The dynamo-electric rotary machine of claim 1, further comprising a conductive layer applied at least on a section of the can and extending at least to a region of the slots of the stator and/or to a region of the winding heads.

12. The dynamo-electric rotary machine of claim 11, wherein at least the stator includes liquid cooling.

13. A geared generator unit, comprising a dynamo-electric rotary machine, said dynamo-electric rotary machine comprising:
    a shaft having a first end and a second end being a free shaft end;
    a bearing arrangement supporting the shaft on only the first end of the shaft for rotation about an axis;
    a rotor defining the axis, the rotor connected to the shaft for rotation about the axis with the shaft the rotor mounted in a floating manner comprising a hub mounted to the free shaft end, a plurality of spokes mounted to the hub, a support structure mounted to the plurality of spokes, and the rotor mounted to the support structure;
    a stator including a winding system arranged in slots and forming winding heads on end sides of the stator and spaced apart from the rotor by an air gap; and
    a can located in the air gap between the rotor and the stator in order to seal the stator and the rotor in relation to each other and designed to separate an interior space of the stator from an Interior space of the rotor, said can having at least one section of average electrical conductivity in a range from 1 S/m to 10000 S/m in an axial and/or a tangential direction and being electrically conductively incorporated in an earthing system of the dynamo-electric rotary machine.

14. The geared generator unit of claim 13, wherein the can and the dynamo-electric rotary machine are connected electrically conductively with a low impedance.

15. A wind turbine, comprising the geared generator unit as set forth in claim 13, wherein the can, the dynamo-electric rotary machine and the geared generator unit are electrically conductively incorporated in an earthing system of the wind turbine.

16. The wind turbine of claim 15, wherein the can, the dynamo-electric rotary machine and the geared generator unit are electrically conductively connected with a low impedance.

* * * * *